(12) United States Patent
Maekawa (10) Patent No.: US 7,932,934 B2
(45) Date of Patent: Apr. 26, 2011

(54) IMAGE PROCESSING METHOD AND IMAGING APPARATUS USING THE SAME

(75) Inventor: Takashi Maekawa, Tokyo (JP)

(73) Assignee: Kyocera Corporation, Kyoto (JP)

( * ) Notice: Subject to any disclaimer, the term of this patent is extended or adjusted under 35 U.S.C. 154(b) by 354 days.

(21) Appl. No.: 12/201,994

(22) Filed: Aug. 29, 2008

(65) Prior Publication Data

US 2009/0066811 A1 Mar. 12, 2009

(30) Foreign Application Priority Data

Aug. 30, 2007 (JP) ................................. 2007-224877

(51) Int. Cl.
*H04N 5/76* (2006.01)
(52) U.S. Cl. ................... 348/231.3; 348/239; 348/222.1
(58) Field of Classification Search ............. 348/231.99, 348/231.3, 231.6, 333.11, 333.12, 222.1, 348/272, 239
See application file for complete search history.

(56) References Cited

U.S. PATENT DOCUMENTS 7,583,301 B2 * 9/2009 Sakurai et al. ................ 348/241
7,630,584 B2 * 12/2009 Nose et al. .................... 382/300

FOREIGN PATENT DOCUMENTS

| JP | 2002-127852 | 5/2002 |
| JP | 2005-326684 | 11/2004 |

* cited by examiner

*Primary Examiner* — Tuan Ho
(74) *Attorney, Agent, or Firm* — Procopio, Cory, Hargreaves & Savitch LLP (57) ABSTRACT

An image processing apparatus and an image processing method are provided. The image processing method is implemented by the apparatus, which receives and stores captured image data. Addresses for the captured image data are generated and stored in a look up table in memory along with color signal data that is stored in an additional data area. Output image data is generated by interpolating the address information in the lookup table to determine coordinate information for the output image. The output image coordinate information allows for drawing an output image with corrected image distortion, corrected perspective distortion, altered viewpoint from captured image, mirror-image conversion, or electronic zooming of the captured image. Color signal data from the additional data area is then used to draw an overlay on the output image in color.

13 Claims, 8 Drawing Sheets

| x<br>y | 0 | 1 | 2 | 3 | 4 | 5 | 6 | 7 | 8 | ... |
|---|---|---|---|---|---|---|---|---|---|---|
| 0 | u00<br>v00 | u10<br>v10 | u20<br>v20 | u30<br>v30 | u40<br>v40 | u50<br>v50 | u60<br>v60 | u70<br>v70 | u80<br>v80 | |
| 1 | u01<br>v01 | u11<br>v11 | u21<br>v21 | u31<br>v31 | u41<br>v41 | u51<br>v51 | u61<br>v61 | u71<br>v71 | u81<br>v81 | |
| 2 | u02<br>v02 | u12<br>v12 | u22<br>v22 | u32<br>v32 | u42<br>v42 | u52<br>v52 | u62<br>v62 | u72<br>v72 | u82<br>v82 | ... |
| 3 | u03<br>v03 | u13<br>v13 | u23<br>v23 | u33<br>v33 | u43<br>v43 | u53<br>v53 | u63<br>v63 | u73<br>v73 | u83<br>v83 | |
| 4 | u04<br>v04 | u14<br>v14 | u24<br>v24 | u34<br>v34 | u44<br>v44 | u54<br>v54 | u64<br>v64 | u74<br>v74 | u84<br>v84 | |
| 5 | u05<br>v05 | u15<br>v15 | u25<br>v25 | u35<br>v35 | u45<br>v45 | u55<br>v55 | u65<br>v65 | u75<br>v75 | u85<br>v85 | |
| 6 | u06<br>v06 | u16<br>v16 | u26<br>v26 | u36<br>v36 | u46<br>v46 | u56<br>v56 | u66<br>v66 | u76<br>v76 | u86<br>v86 | |
| ⋮ | | | | ⋮ | | | | | | ⋱ |

IMAGE PROCESSING METHOD AND IMAGING APPARATUS USING THE SAME

CROSS-REFERENCE TO RELATED APPLICATION

The present application claims priority under 35 U.S.C. §119 to Japanese Patent Application No. 2007-224877, filed Aug. 30, 2007, entitled "IMAGE PROCESSING METHOD AND IMAGING APPARATUS USING THE SAME," the entirety of which is incorporated herein by reference.

BACKGROUND OF THE INVENTION

1. Field of the Invention

The present invention generally relates image processing and more particularly relates to outputting images that have undergone various types of image processing.

2. Description of the Related Art

Imaging lenses typically used for cameras and the like have various types of aberrations, such as spherical aberration, astigmatism and comatic aberration. Among them, aberrations causing geometrical distortion of a captured image are called distortion aberrations. As typical measures for reducing the distortion aberration, a lens exhibiting minimized distortion aberration is designed.

However, lenses having the distortion aberration as-is have been used for special applications. For example, in a monitor imaging apparatus that is attached to the back of a vehicle and that captures images for rear-viewing, a fish-eye lens or the like to capture images of a very wide range at a super-wide angle is used so that a pedestrian who recognizes the existence of the vehicle but approaches without expecting reverse of the vehicle can be found without fail. Also, in a monitor imaging apparatus that is placed at an entrance and that captures images of visitors, a fish-eye lens or the like having a super-wide shooting range is used so that images of a person can be captured even if the person is at a position in a slanting direction with respect to the imaging apparatus.

In those lenses used for such applications, higher priority is put on imaging at a super-wide angle rather than on correction of the distortion aberration, and thus even significant distortion aberration of the fish-eye lens is left in many cases. However, since the fish-eye lens covers a view field of nearly 180 degrees, a subject near the edge of an image captured by the lens is distorted to a large extent, and it may be difficult to determine what a subject in the image is, e.g., a person or a pole.

Conventional vehicle-surroundings display apparatus capture images of situations around a vehicle and display the situations around the vehicle and a figure representing the vehicle on the same screen, so as to show a boundary of driving lanes to a driver. Such a conventional apparatus includes a television camera; a coordinate transforming unit, an area specifying unit, and an image signal generating unit to perform distortion correction and viewpoint conversion on the imaging signal and generate an image signal; a drawing signal generating unit to generate a drawing signal indicating the vehicle; an image combining unit to combine the generated image signal with the generated drawing signal so as to generate a display signal; and a display. With this configuration, the apparatus is expensive.

Also, a conventional multiplexing technique of combining two imaging formats of different resolutions exists. For example, an HD (High Definition) imaging signal is converted to an SD (Standard Definition) imaging signal of the NTSC (National Television Standards Committee) or the PAL (Pase Alternating Line) by a imaging resolution converting unit, a synchronization signal as that of SD imaging obtained by performing frequency division on the HD imaging signal and a synchronization signal based on the SD imaging signal are supplied to a memory control unit, OSD (on screen display) data is read from a memory and is combined with the SD imaging signal based on the respective synchronization signals, and the OSD data combined with the SD imaging signal is output. Such an apparatus is complicated and expensive.

An image processing method for displaying images and/or characters in a processed image corrected with various types of image processing and an imaging apparatus using the method have been demanded.

SUMMARY OF THE INVENTION

Described herein is an image processing method and an imaging apparatus that employs the image processing method. The imaging apparatus capture image data and stores the data in memory. The imaging apparatus also stores color signal data in an additional data area in memory. The imaging apparatus performs one or more types of image processing on the captured image to create a corrected output image based on the captured image. The output image is drawn on a display. Color signal data from the additional data area in memory is used to draw an overlay in color on the output image on the display.

The various types of image processing include, for example, correction of an image having distortion due to the distortion aberration of an imaging lens, an image having unnatural perspective distortion of a subject due to high-angle or overhead photography, generation of an output image with the viewpoint changed from the viewpoint of a captured image, mirror-image conversion of a captured image, and electronic zooming. The present invention also relates to an imaging apparatus that uses the image processing method.

DESCRIPTION OF THE PREFERRED EMBODIMENTS

Hereinafter, a preferred exemplary embodiment of the present invention is described in detail with reference to the drawings. Note that the form of the elements described in this embodiment is only an example and the scope of the invention is not limited thereto. In this embodiment, "various types of image processing" include, but are not limited to correction of image distortion resulting from an imaging lens, correction of image inclination due to a perspective effect or a high-angle view, change of a viewpoint, mirror-image conversion, and electronic zooming.

Hereinafter, an imaging apparatus performing the image processing method and the operation of the apparatus are described with reference to FIGS. 1 and 2.

The imaging apparatus includes an imaging lens 1. The lens 1 used in the imaging apparatus includes a so-called wide-angle lens having an angle of field of more than 35 degrees in the longitudinal direction; or a so-called fish-eye lens having an angle of field of nearly 180 degrees or more, which is a super-wide-angle lens having distortion aberration. The present invention exhibits a great effect when such a wide-angle lens is used. However, a lens of any angle of field may be used as long as a perspective effect is obtained in high-angle photography. For example, a lens called a normal lens in a general photography field or a telephoto lens approximate to the normal lens may be used.

The imaging apparatus also includes a solid-state imaging device 2, such as a charge coupled device (CCD) or a complementary metal oxide semiconductor (CMOS); an video signal processing unit 3 to remove a noise component from an analog image signal from the solid-state imaging device 2, amplify the analog image signal, and convert the analog image signal to a digital image signal; and a captured image data memory 4 to store captured image data corresponding to the digital image signal generated through conversion.

The imaging apparatus also includes a coordinate transforming unit 5 to perform at least one of the various types of image processing in accordance with the image processing method. The coordinate transforming unit 5 includes an output image generating unit 51 to generate output image data on which the above-described correction has been done in accordance with the image processing method; and a coordinate calculating unit 52 to sequentially obtain addresses of the output image data output from the output image generating unit 51 and transmit the addresses to a first interpolating unit 53, so that the data in the captured image data memory 4 corresponding to the transmitted addresses is eventually transmitted to the output image generating unit 51.

Reference numeral 53 denotes an interpolating unit to obtain an address of the captured image data memory 4 corresponding to an address of output image data transmitted from the coordinate calculating unit 52 by referring to one of a plurality of look-up tables (LUT) 54 and transmit the captured image data stored in the address of the captured image data memory 4 as output image data to the output image generating unit 51. In the case where an address of the captured image data memory 4 stored in the LUT 54 is an address that includes a fractional portion and that does not exist in the captured image data memory 4, that is, an address 25 illustrated in FIG. 4B described below, the interpolating unit 53 calculates luminance data and color-tone data through interpolation with reference to addresses of surrounding points.

The elements constituting the imaging apparatus using the image processing method according to the present invention have been described above. Before describing an operation of the imaging apparatus illustrated in FIG. 1, a process of reading captured image data from the address of the captured image data memory 4 corresponding to an address of output image data and a process of displaying an arbitrary image by using the image processing method according to the present invention are described with reference to FIGS. 3 to 5.

Figure 3:
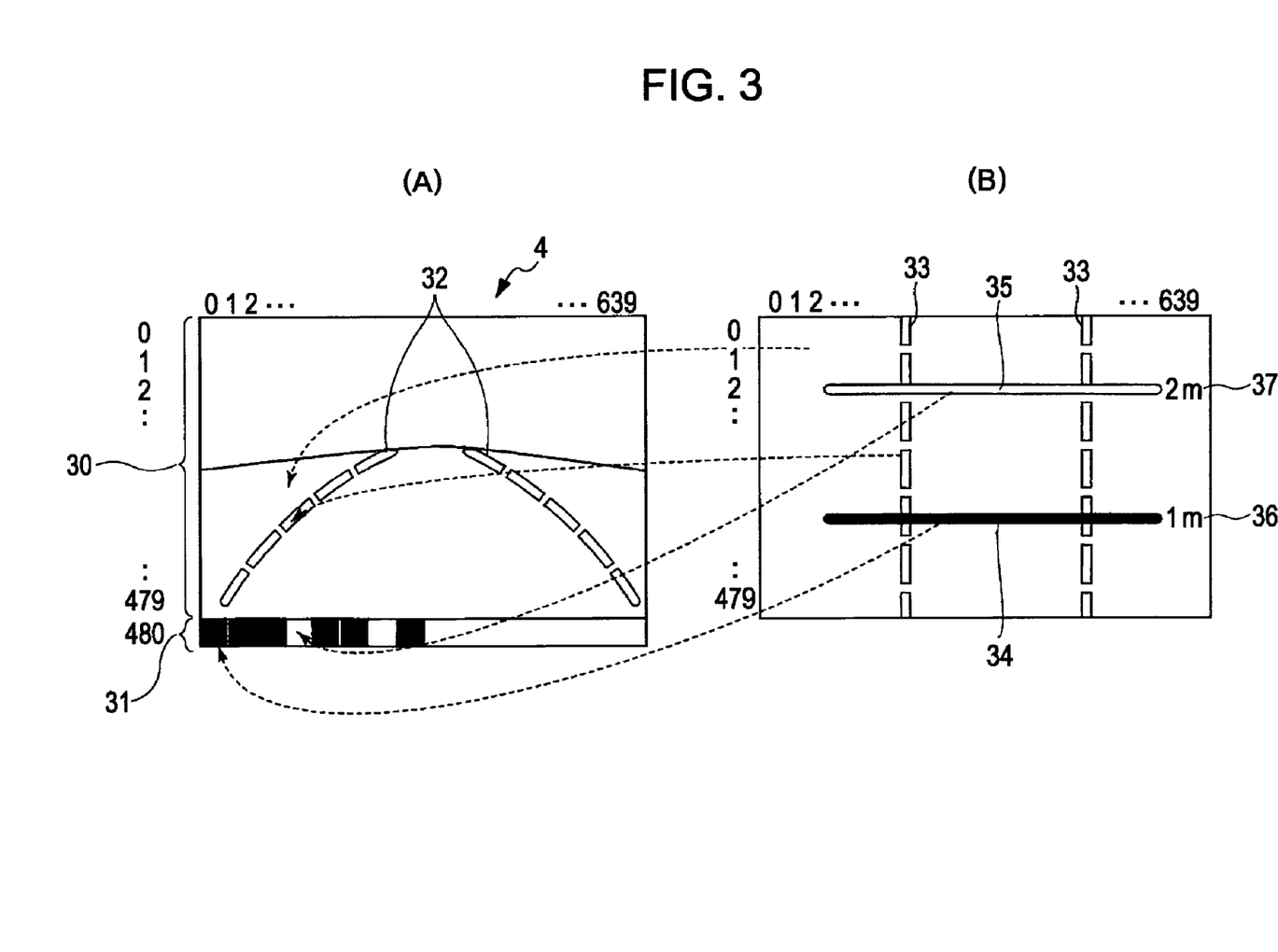
FIG. 3 is a diagram illustrating a method for drawing a line in an image by using an image processing method according to the present embodiment.

First, FIG. 3 illustrates a method for correcting image distortion due to the imaging lens 1 and image inclination due to high-angle photography and drawing lines 34 and 35 in an image by using the image processing method according to the present invention. In FIG. 3, (A) illustrates the captured image data memory 4 to store an image of a parking lot captured by the imaging apparatus 41 provided at the rear portion 42 of the vehicle 40, as described below with reference to FIGS. 6A to 6D. Reference numeral 30 denotes a captured image area to store the captured image data, whereas reference numeral 31 denotes an additional data area to store one or more types of color signal data. On the other hand, (B) in FIG. 3 illustrates an example of output image data. In this output image data, lines 32 indicating a parking position that are curved due to the lens and that are narrower-spaced as they are farther from the vehicle due to a high-angle view in the image illustrated in (A) have been corrected to parallel lines 33, and auxiliary lines 34 and 35 are displayed at the positions of about 1 m and 2 m from the rear portion 41 of the vehicle.

In order to correct the lines 32 indicating the parking position that are curved due to the lens and that are narrower-spaced as they are farther from the vehicle due to a high-angle view as illustrated in (A) to the parallel lines 33, the correspondence between positions where respective points on a subject are actually focused due to distortion aberration or high-angle photography and focused positions without distortion aberration or focused positions after correction of a perspective effect is examined in the image processing method and the imaging apparatus using the image processing method according to the present invention. The correspondence is stored in the LUT 54. At generation of an output image, the LUT 54 is referred to for respective output image addresses, the address of the captured image data memory 4 storing captured image data corresponding to each output image address is examined, and the data at the address is regarded as output image data, so that an output image on which correction has been done can be obtained.

Regarding the auxiliary lines 34 and 35 illustrated in (B) in FIG. 3, the address of color signal data in the additional data area 31 illustrated in (A) in FIG. 3 of the captured image data memory 4 is stored in the address in the LUT 54 corresponding to the address of output image data for displaying the auxiliary lines 34 and 35. Then, when the address of the output image data is read, the color signal in the additional data area 31 is transmitted as output image data at the part storing the address of the color signal data. Accordingly, the auxiliary lines 34 and 35 and characters "1 m" and "2 m"

denoted by reference numerals 36 and 37 illustrated in (B) in FIG. 3 can be displayed in a display device as an overlay on the output image.

Figure 5:
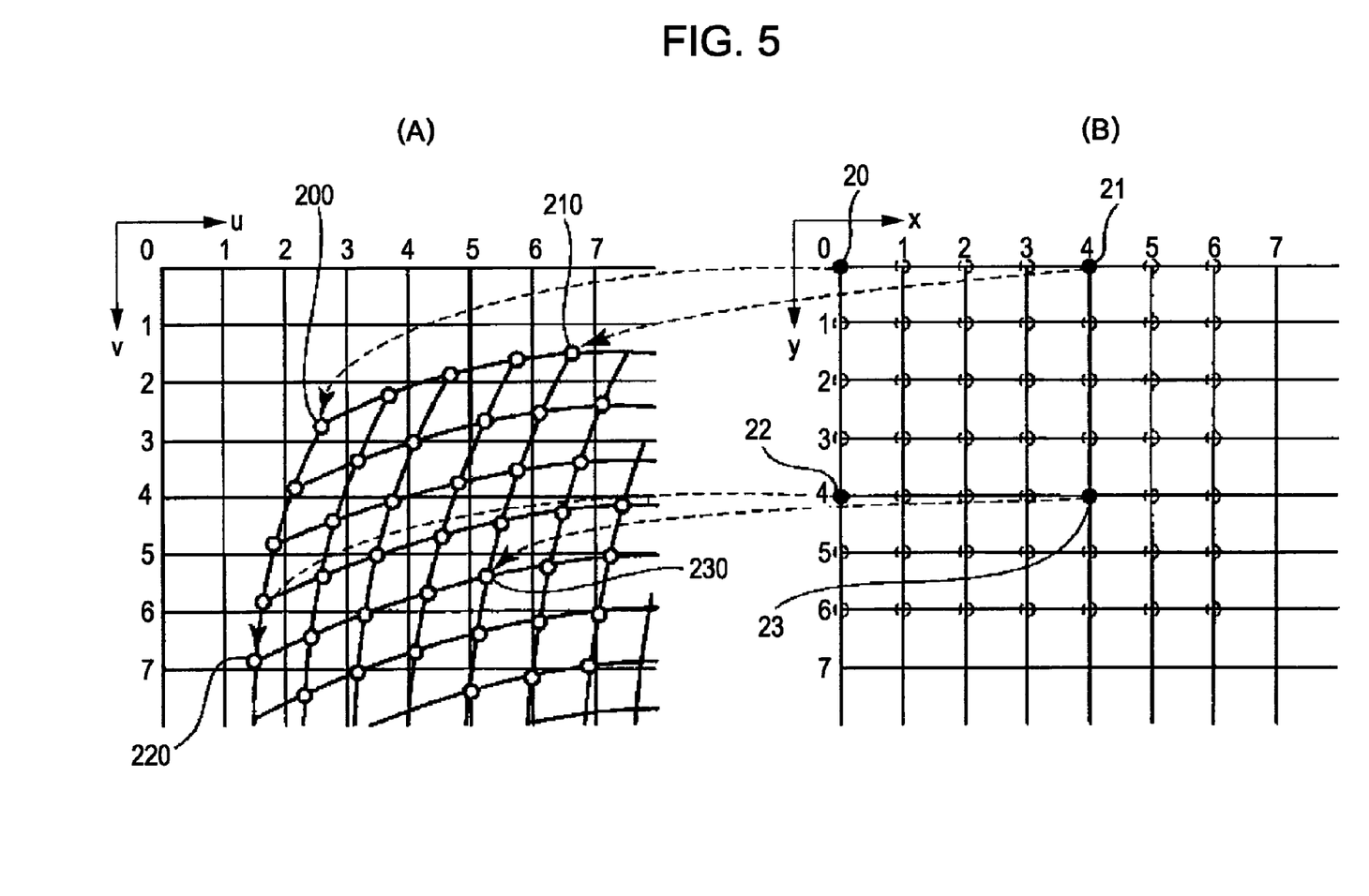
FIG. 5 illustrates the correspondence between addresses of captured image data (A) obtained in the imaging apparatus using an imaging lens causing distortion and addresses of output image data (B) in which the distortion has been corrected, the output image data (B) being obtained based on the captured image data (A)

FIG. 5 illustrates the correspondence between the positions where the respective points on a subject are actually focused due to distortion aberration or high-angle photography and the focused positions without distortion aberration or the focused positions after correction of a perspective effect.

FIG. 5 illustrates the correspondence between actual output image data and captured image data. Specifically, FIG. 5 illustrates the correspondence between addresses (u, v) of captured image data (A) and addresses (x, y) of output image data (B) in order to obtain output image data (B) in which distortion has been corrected based on captured image data (A) that is obtained in an imaging apparatus including an imaging lens that causes distortion, such as a fish-eye lens. Here, each of the integers "a" and "b" is 4 for easy understanding.

The address (u, v) of captured image data (A) corresponding to the address (0, 0) denoted by numeral 20 in output image data (B) is an address (2.7, 2.8) denoted by numeral 200 in captured image data (A) indicated by an arrow starting from the position denoted by numeral 20, due to distortion of the imaging lens. Thus, in the address (0, 0) of the LUT 54, an address data (u00=2.7, v00=2.8) denoted by numeral 200 of the captured image data is stored.

Likewise, the address of captured image data (A) corresponding to the address (4, 0) of a×1 in the x-direction denoted by numeral 21 of output image data (B) is an address (6.6, 1.5) denoted by numeral 210 in captured image data (A) indicated by an arrow starting from the position denoted by numeral 21. Thus, in the address (4, 0) of the LUT 54, an address (u40=6.6, v40=1.5) denoted by numeral 210 in the captured image data is stored.

In the example illustrated in FIG. 5, the integers "a" and "b" are 4, and thus data is stored in the following manner. In the address (0, 0) of the LUT 54, the address data (u00=2.7, v00=2.8) denoted by numeral 200 in the captured image data memory 4 corresponding to the address (0, 0) denoted by numeral 20 in the output image data is stored. In the address (4, 0) of the LUT 54, the address (u40=6.6, v40=1.5) denoted by numeral 210 in the captured image data memory 4 corresponding to the address (4, 0) denoted by numeral 21 of a×1 in the x-direction in the output image data is stored.

Also, in the address (0, 4) in the second row of the LUT 54, an address data (1.5, 6.9) denoted by numeral 220 in the captured image data corresponding to an address (0, 4) of b×1 in the y-direction denoted by numeral 22 in the output image data is stored. In the address (4, 4) of the LUT 54, an address (5.2, 5.3) denoted by numeral 230 in the captured image data corresponding to an address (4, 4) of a×1 in the x-direction denoted by numeral 23 in the output image data is stored. In this way, data is stored.

With this configuration of the LUT 54, by referring to the address in the LUT 54 corresponding to an address of output image data, the address of captured image data corresponding to the address of the output image data can be obtained. If the address includes a fractional portion, the captured image data is calculated in the method illustrated in FIG. 4B, as described below.

Figure 4A:
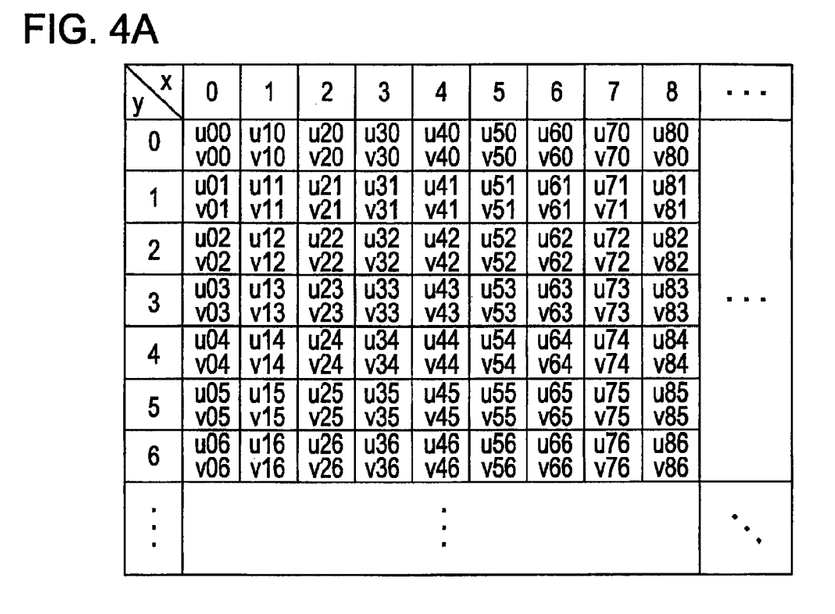
FIG. 4A illustrates a look-up table used in the image processing method according to the present embodiment.
Figure 4B:
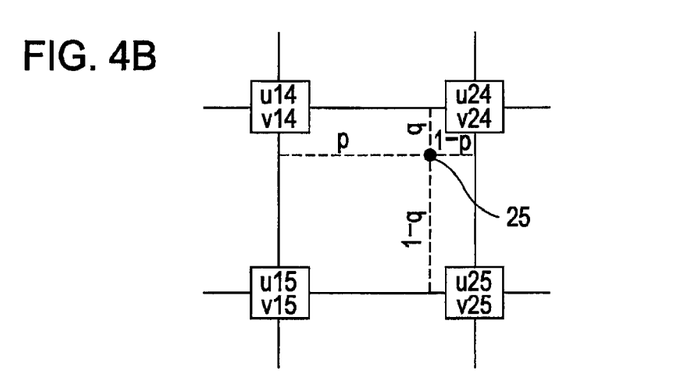
FIG. 4B illustrates a method for calculating addresses (u, v) of captured image data by using the look-up table.

FIG. 4A illustrates an example of the LUT 54 generated in this way. In FIG. 4A, "x" at the top indicates a horizontal scanning direction of output image data, that is, addresses in an x-direction. On the other hand, "y" at the left end indicates a vertical scanning direction of output image data, that is, addresses in a y-direction. u00, u10, u20, . . . are address data storing the addresses of the captured image data memory 4 corresponding to x-direction addresses of the output image data. Likewise, v00, v10, v20, . . . are address data storing the addresses of the captured image data memory 4 corresponding to y-direction addresses of the output image data.

For example, assume that the addresses corresponding to the display positions of the auxiliary (overlay) lines 34 and 35 and the characters "1 m" and "2 m" denoted by reference numerals 36 and 37 illustrated in (B) in FIG. 3 are (3, 2), (4, 2), (5, 2), . . . . In this case, address data (0, 480) and (639, 480) of a necessary color in the additional area 31 illustrated in (A) in FIG. 3 is input to address data (u32, v32), (u42, v42), (u52, v52), . . . corresponding to those lines and characters in the LUT 54. Thus, when the LUT 54 is referred to for obtaining output image data, color data of the addresses specified by (u32, v32), (u42, v42), (u52, v52), is output to (3, 2), (4, 2), (5, 2), . . . . Accordingly, image distortion due to the imaging lens 1 or a perspective effect is corrected as illustrated in (B) in FIG. 3, and the auxiliary (overlay) lines 34 and 35 and the characters "1 m" and "2 m" denoted by reference numerals 36 and 37 are displayed.

The address of the captured image data memory 4 obtained by referring to the address in the LUT 54 corresponding to the address of the output image data includes a fractional portion in many cases, as described below with reference to FIG. 5. However, the address of the captured image data memory 4 is an integer, so that the address is not found. Therefore, for example, if this address corresponds to the position indicated by reference numeral 25 illustrated in FIG. 4B, output image data is obtained through calculation in the interpolating unit 53 by using the captured image data at the addresses (u14, v14), (u24, v24), (u15, v15), and (u25, v25) around the position denoted by reference numeral 25.

For example, in the case where captured image data lin (u, v) at the address (u, v) in the captured image data memory 4 is calculated through bilinear interpolation, the following expressions (1) and (2) are used.

Then, the address (u, v) of the captured image data is calculated in the first interpolation process, for example, in a bilinear interpolation process according to the following expressions (1) and (2).

$$u = (1-p)(1-q)*u14 + p(1-q)*u24 + (1-p)q*u15 + pq*u25 \quad (1)$$

$$v = (1-p)(1-q)*v14 + p(1-q)*v24 + (1-p)q*v15 + pq*v25 \quad (2)$$

Here, p=0.75 and q=0.25.

In the case where the value of the captured image data is calculated through bicubic interpolation, the following expressions (3) to (6) are used. Note that "lin" calculated here is data of a luminance value (Y) in the case of a monochrome image or data of RGB or YUV in the case of a color image. The cases where bilinear interpolation is used and where bicubic interpolation is used are described as examples, but the value can be calculated through another type of interpolation.

$$f(t) = \frac{\sin \pi t}{\pi t} \quad (3)$$

$$x1 = 1 + 0.4, \ x2 = 0.4, \ x3 = 1 - 0.4, \ x4 = 2 - 0.4 \quad (4)$$

$$y1 = 1 + 0.6, \ y2 = 0.6, \ y3 = 1 - 0.6, \ y4 = 2 - 0.6 \quad (5)$$

$$Iout(140, 340) = [f(y1)f(y2)f(y3)f(y4)] \times \begin{bmatrix} lin(12, 86) & lin(13, 86) & lin(14, 86) & lin(15, 86) \\ lin(12, 87) & lin(13, 87) & lin(14, 87) & lin(15, 87) \\ lin(12, 88) & lin(13, 88) & lin(14, 88) & lin(15, 88) \\ lin(12, 89) & lin(13, 89) & lin(14, 89) & lin(15, 89) \end{bmatrix} \begin{bmatrix} f(x1) \\ f(x2) \\ f(x3) \\ f(x4) \end{bmatrix} \quad (6)$$

Figure 4C:
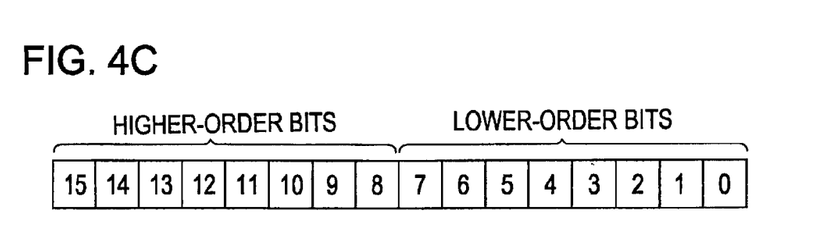
FIG. 4C illustrates that look-up table data is composed of two bytes.

In the LUT 54 illustrated in FIG. 4A, all address data may be stored in the memory, or data of addresses in the horizontal scanning direction (x-direction) and data of addresses in the vertical scanning direction (y-direction) may be separately stored. In the case where the address data in the horizontal and vertical scanning directions stored in each address in the LUT is composed of 2 bytes (16 bits) as illustrated in FIG. 4C, u (horizontal scanning direction) address data may be assigned to lower-order bits 0 to 7 and v (vertical scanning direction) address data may be assigned to higher-order bits 8 to 15. In this way, addresses in the horizontal and vertical directions can be obtained by one search of the LUT 54.

Figure 8:
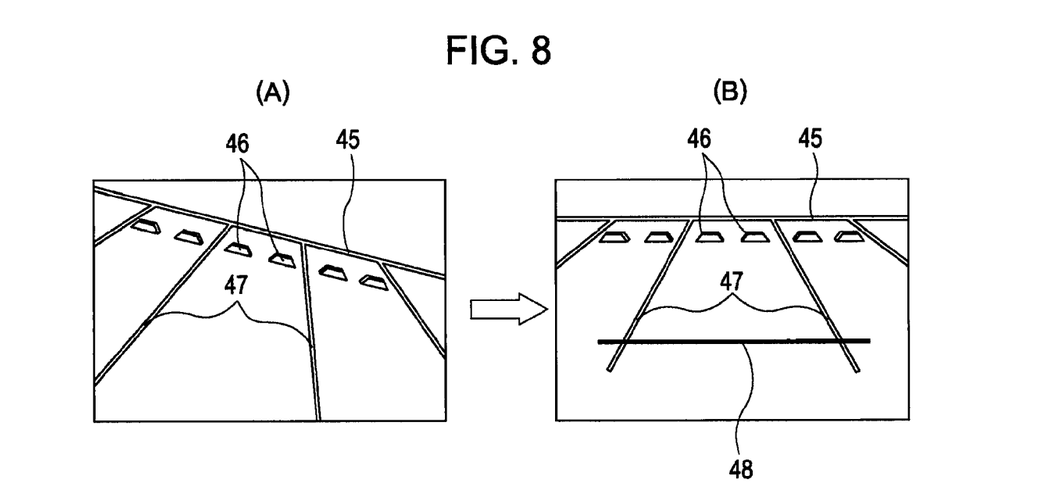
FIG. 8 illustrates image (A) with a perspective effect captured at a high angle by an imaging apparatus using a wide-angle lens and image (B) generated by changing a viewpoint.
Figure 9:
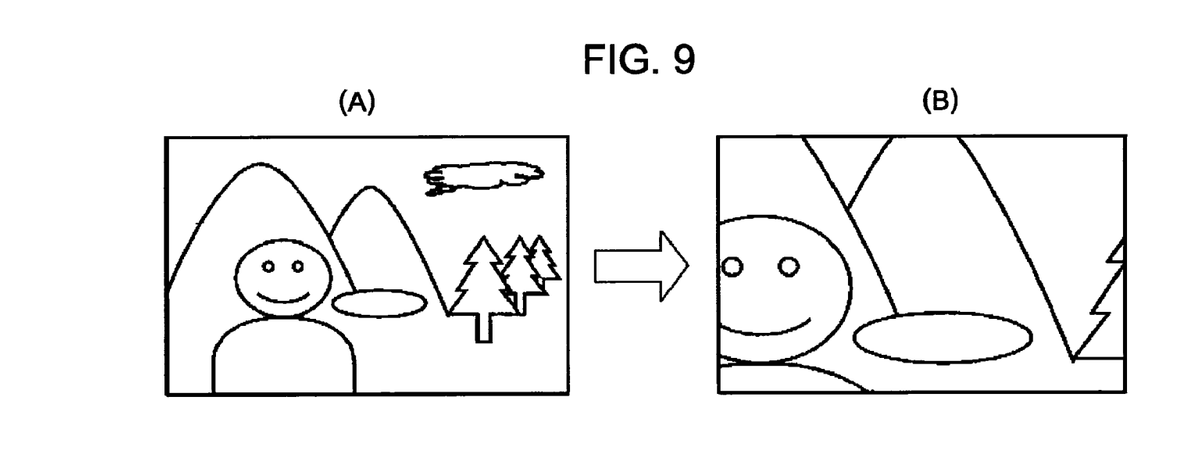
FIG. 9 illustrates electronic zooming to zoom in an arbitrary portion of image (A) obtained from an imaging apparatus to image (B)
Figure 10:
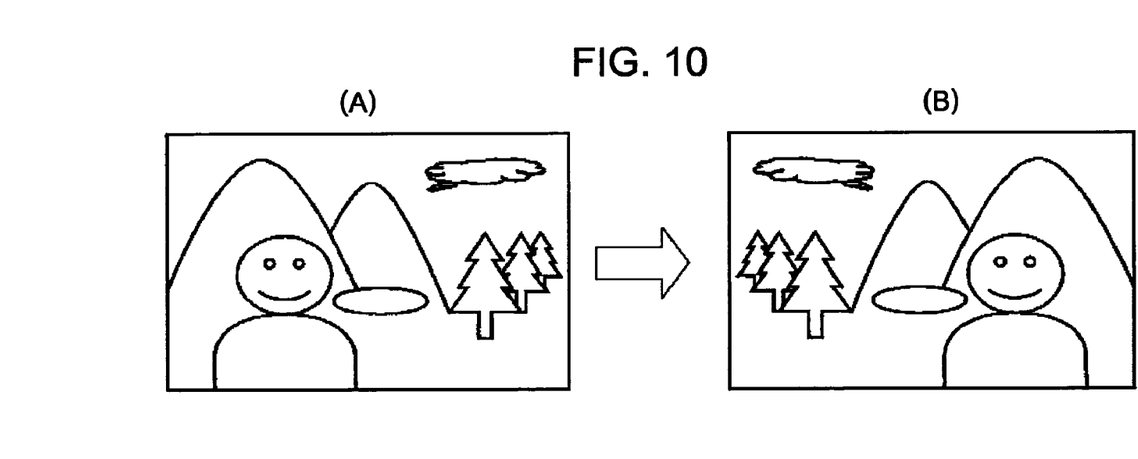
FIG. 10 illustrates mirror-image conversion of image (A) obtained from an imaging apparatus to image (B).

The image processing method according to the present invention and the elements of the imaging apparatus using the image processing method have been described above. Hereinafter, the image processing method according to the present invention is described with reference to FIG. 1 and FIG. 2 which is a flowchart illustrating the image processing method according to the present invention. The following description is based on the assumption that the LUT 54 illustrated in FIG. 1 includes look-up tables used for correcting image inclination of image data obtained through high-angle photography as illustrated in (A) in FIG. 3 to the image illustrated in (B) in FIG. 3 at parking, displaying the auxiliary (overlay) lines 34 and 35 and the characters 36 and 37, or performing various types of image conversion, such as change of a viewpoint, conversion to a mirror image, and electronic zooming, as illustrated in FIGS. 8 to 10. However, the present invention is not limited to such a case.

Figure 1:
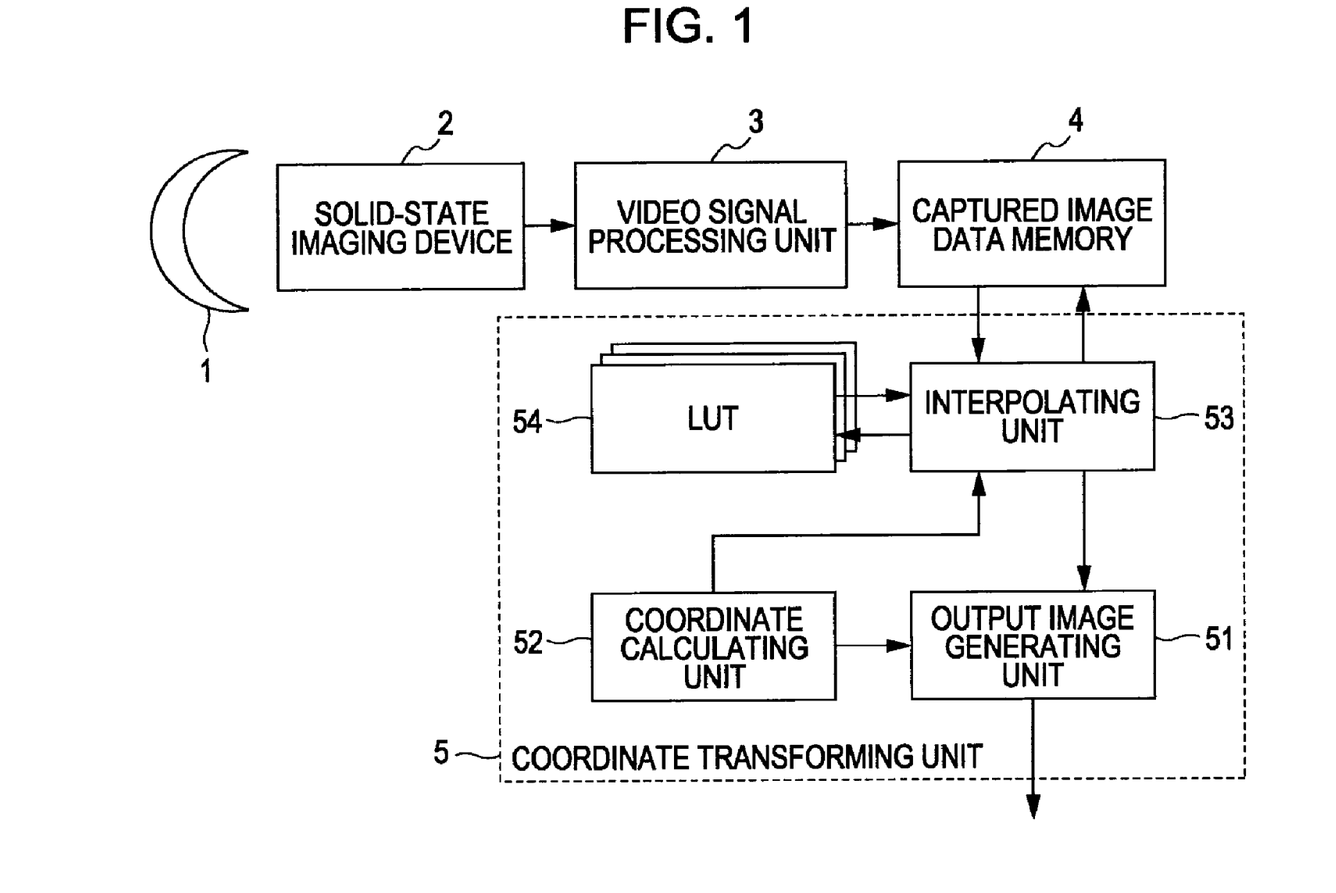
FIG. 1 is a block diagram of an imaging apparatus using an image processing method according to an embodiment.
Figure 2:
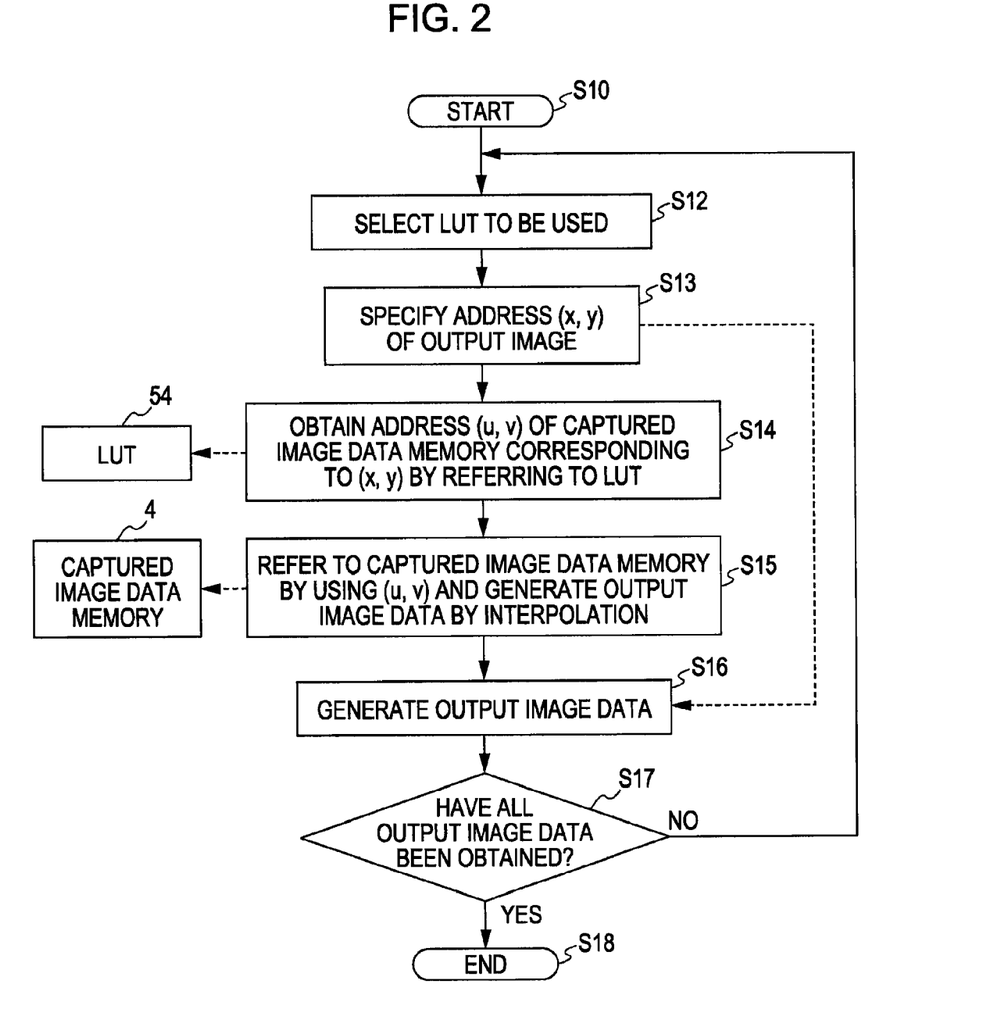
FIG. 2 is a flowchart of a process performed by the imaging apparatus using the image processing method according to the present embodiment.

In the imaging apparatus having the above-described configuration, when the process illustrated in the flowchart in FIG. 2 starts in step S10, analog image data of an image formed on the solid-state imaging device 2 through the imaging lens 1 shown in FIG. 1 is transmitted to the video signal processing unit 3, where noise is removed and the data is amplified and is converted to digital image signals, which are stored in the captured image data memory 4. In the case where an output from the solid-state imaging device 2 is image signals of an interlace method, if image processing is performed on data in an odd-number field and data in an even-number field separately, interpolation intervals become long and image quality degrades. Therefore, it is preferred that data in an odd-number field and data in an even-number field are combined in the captured image data memory 4 into frame data and that the frame data is output as data in the interlace method or progressive method from the output image generating unit 51.

Then, after the image signal has been stored in the captured image data memory 4, an image converting process (e.g., correction of image distortion due to the imaging lens, correction of image inclination due to a perspective effect or a high-angle view, change of a viewpoint, conversion to a mirror image, or electronic zooming) to be performed on the image captured by the imaging apparatus illustrated in FIG. 1 is selected, that is, the LUT 54 corresponding to a selected image correction process is selected, in step S12 in FIG. 2. In the case where only a single LUT is used, this step may be omitted.

Then, in step S13, the coordinate calculating unit 52 illustrated in FIG. 1 specifies an address (x, y) of the output image data and transmits the address to the output image generating unit 51 and the interpolating unit 53. In step S14, the interpolating unit 53 obtains the address (u, v) of the captured image data memory 4 corresponding to the transmitted address (x, y) of the output image data in the LUT 54 selected in step S12.

In step S15, the captured image data memory 4 is referred to by using the address (u, v) of the captured image data memory 4. If the address includes a fractional portion and does not exist in the captured image data memory 4, the addresses around the address (u, v) of the captured image data memory 4 are referred to, and the corresponding captured image data lin (u, v) is generated through bilinear interpolation with the use of above expressions (1) and (2) or bicubic interpolation with the use of above expressions (3) to (6).

After the captured image data lin (u, v) has been generated in this way, the interpolating unit 53 transmits the data to the output image generating unit 51 in step S16, and also transmits the data to an output image data memory and a display device (not illustrated), so as to display or store an image in which image distortion due to the imaging lens 1 or a perspective effect has been corrected. In step S16, the generated captured image data is transmitted to the output image generating unit 51 and is transmitted to an output image data memory or a display apparatus (not illustrated). In step S17, it is determined whether all output image data of one frame have been obtained. If the determination is "No", the process returns to step S12 and the same steps are repeated. If the determination is "Yes", the process proceeds to step S18 and the process ends.

As described above with reference to FIG. 4A, in the case where the address of a necessary color in the additional area 31 illustrated in (A) in FIG. 3 is stored in the addresses corresponding to the display positions of the auxiliary (overlay) lines 34 and 35 and the characters "1 m" and "2 m" denoted by reference numerals 36 and 37 illustrated in (B) in FIG. 3 in the LUT 54, color data of the color of the specified address is output when the address in the LUT 54 is referred to. In step S15, image distortion due to the imaging lens 1 or a perspective effect is corrected as illustrated in (B) in FIG. 3, and the auxiliary (overlay) lines 34 and 35 and the characters "1 m" and "2 m" denoted by reference numerals 36 and 37 are quickly displayed.

As described above, processes such as correction of image distortion due to the imaging lens, correction of image inclination due to a perspective effect or a high-angle view, change of a viewpoint, conversion to a mirror image, and electronic zooming are performed by using the LUT 54. Also, an arbitrary image including the auxiliary (overlay) lines 34 and 35 and the characters "1 m" and "2 m" denoted by reference numerals 36 and 37 illustrated in (B) in FIG. 3 is displayed at a predetermined position by using the LUT 54. Accordingly, an image processing method and an imaging apparatus using the image processing method that do not require an extra configuration for drawing and an independent process can be realized with a simple configuration and at low cost without using an expensive high-speed element.

The positions of about 1 m and 2 m from the rear portion 41 of the vehicle, denoted by reference numerals 34 and 35, and the display of the characters in (B) in FIG. 3 are only examples. Embodiments of the present invention can be used also in the case of displaying respective statuses in change of a viewpoint, conversion to a mirror image, and electronic zooming described above, and displaying instructions on the screen.

Figure 6A:
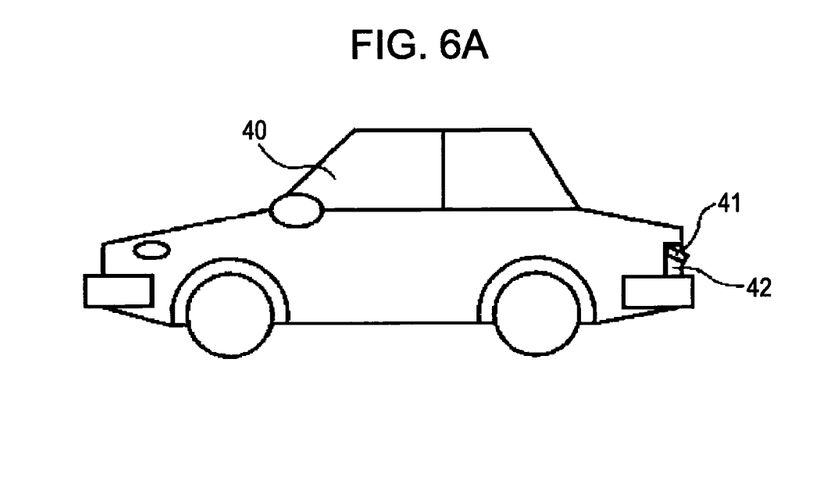
FIGS. 6A and 6B are a side view and a back view illustrating the position of the imaging apparatus attached to the back of a vehicle.
Figure 6B:
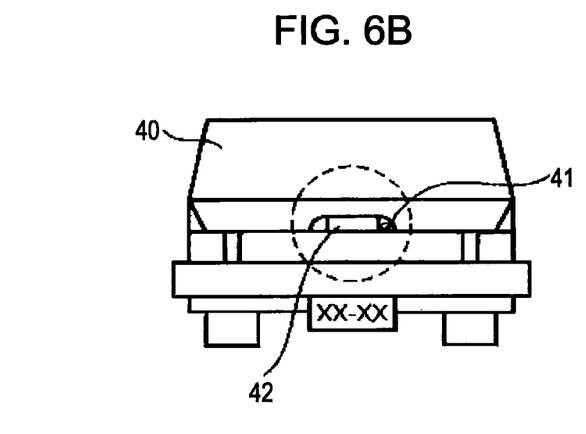
Figure 6C:
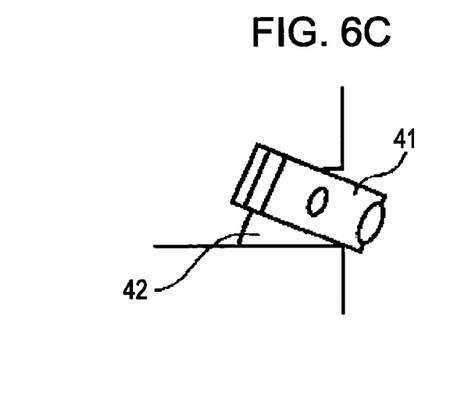
FIG. 6C is an enlarged cross-sectional view illustrating a state where the imaging apparatus is attached.
Figure 6D:
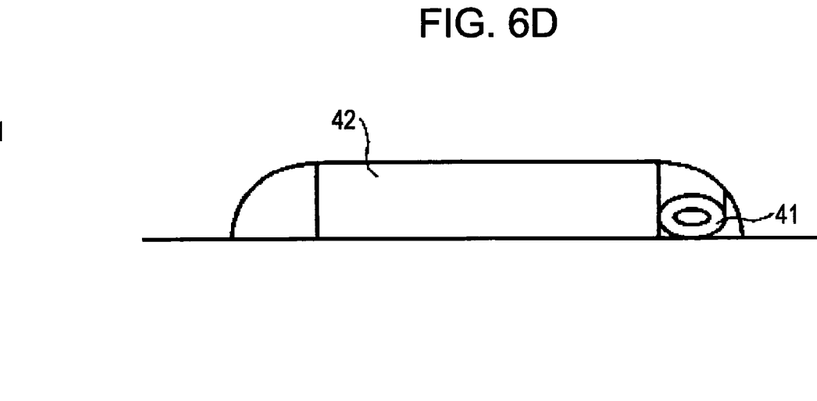
FIG. 6D is an enlarged view of the attached position.

Referring to FIGS. 6A and 6B, it is becoming a common practice to attach an imaging apparatus 41 to a back 42 of a vehicle 40, capture images during a reverse, and display the images in a display apparatus so that the vehicle can be easily parked. FIG. 6C is an enlarged cross-sectional view illustrating an attachment state of the imaging apparatus 41 and FIG. 6D is an enlarged view of a position where the imaging apparatus 41 is attached. The above-described fish-eye lens or an ordinary wide-angle lens is used in the imaging apparatus 41 in this example. In many cases, the imaging apparatus 41 is attached to the back 42 of the vehicle 40 such that the lens of the imaging apparatus 41 is oriented to the ground in a slanting direction, as illustrated in FIG. 6C.

Figure 7:
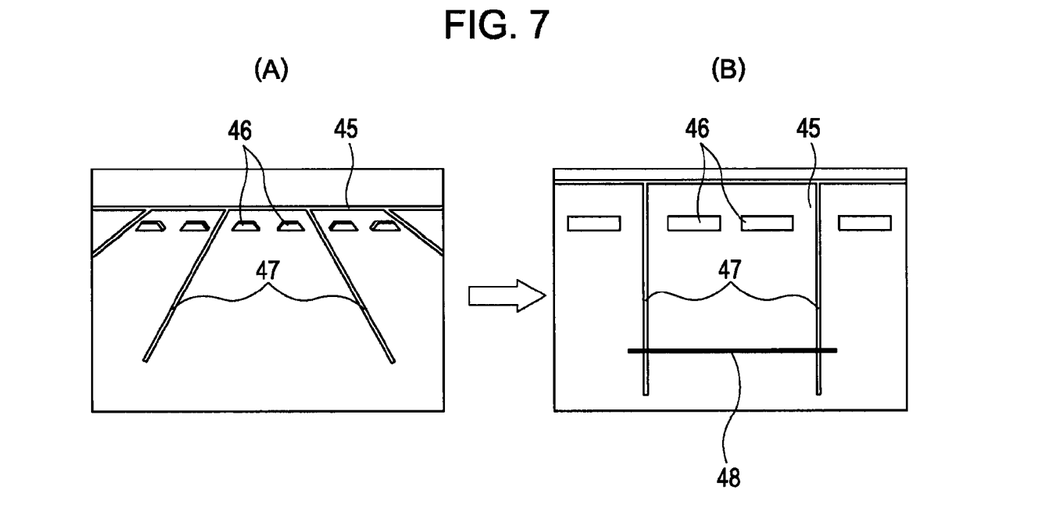
FIG. 7 illustrates image (A) with a perspective effect captured at a high angle by an imaging apparatus using a wide-angle lens and image (B) in which the perspective effect has been corrected.

Therefore, even if an ordinary wide-angle lens is used in the imaging apparatus 41, images obtained therefrom to be displayed are high-angle shots, that is, images with a perspective effect in which a nearer object is represented as larger and a farther object is represented as smaller, as illustrated in (A) in FIG. 7. Note that, in FIG. 7, reference numeral 45 denotes a position where a concrete wall rises, 46 denotes wheel stoppers, and 47 denotes lines indicating a parking position. However, when a driver tries to park the vehicle by reversing it while watching such an image with a perspective effect, he/she cannot sensuously recognize the distance between the vehicle and the wheel stoppers 46, so that he/she eventually reverses the vehicle by watching the back side with his/her eyes with the window or door opened, without watching a display screen. Accordingly, neither the imaging apparatus nor the display apparatus is utilized.

In such a case, an imaging apparatus that captures an image formed through a lens as image signals from an imaging device is capable of correcting data of an image having distortion or a perspective effect, unlike a silver-salt camera.

Specifically, as illustrated in (B) in FIG. 7, image data is corrected so that nearer and farther objects are displayed in the same size. For example an image is displayed such that the parking lines 47 are parallel to each other. Also, a color line 48 is displayed as an overlay on the output image, for example, at the position about 1 m from the back of the vehicle 42 so that the distance between the back of the vehicle 42 and the wheel stoppers 46 or the wall 45 can be recognized. Accordingly, the driver can sensuously recognize the distance between the back of the vehicle 42 and the wheel stoppers 46 or the wall 45 at a glance, which is very convenient.

Furthermore, in the imaging apparatus (rearview display apparatus) 41 attached to the back of the vehicle 42, if an image with an angle according to the attached position of the imaging apparatus as illustrated in (A) in FIG. 8 is corrected to an image of a view from a rear window of the vehicle as illustrated in (B) in FIG. 8 or to an image in which nearer and farther objects have the same size as illustrated in (B) in FIG. 7 and if the corrected image can be displayed and a colored line 48 can be displayed as an overlay on the output image, for example, at about 1 m from the back of the vehicle 42 as mentioned above, the utility value of the imaging apparatus 41 increases.

In a so-called digital camera, various types of image processing may be demanded, for example, electronic zooming to zoom in an arbitrary portion (e.g., center) of a captured image as illustrated in (A) in FIG. 9 in the manner illustrated in (B) in FIG. 9; and mirror-image conversion to convert a captured image as illustrated in (A) in FIG. 10 to a mirror image as illustrated in (B) in FIG. 10. That is, in the case where a user takes an image of himself/herself by holding a digital camera in hand with the lens directed to himself/ herself (self shooting), for example in the case where a shooter takes an image of himself/herself while watching himself/herself on a display, if the user moves the camera in such a direction that himself/herself will be positioned at the center of a field, the camera may be actually moved in such a direction that the user departs from the center of the field because the moving direction of the camera is opposite to the moving direction of the user in the field.

However, such a mistake can be avoided by using the mirror-image conversion, which realizes matching between the both directions. Also, when self shooting is performed by using zooming-in by electronic zooming, a small action is amplified, and thus, when the mirror-image conversion is not performed and when the above-described both moving directions are opposite to each other, the user may be out of the field and it may be difficult to recover an original state. Such a problem can be avoided by using the mirror-image conversion, and the user's position for shooting can be recognized more appropriately. In such mirror-image conversion or electronic zooming, it is preferable for a user if an image or characters indicating that mirror-image conversion or electronic zooming (not optical zooming) is currently being performed can be displayed.

In the above-described case where an imaging lens has distortion aberration or where an image captured by an imaging apparatus placed at a height has distortion due to a perspective effect, the image can be corrected in the following way. First, the correspondence between (i) the positions where respective points on a subject actually form an image by distortion aberration or high-angle photography and (ii) the positions of an image to be formed without distortion aberration or the positions of an image to be formed with a perspective effect being corrected is examined. Then, when the image data is output from an image data memory storing captured image data obtained from the imaging device, calculation is performed to determine the address in the image data memory of the captured image data to be read to output data in which aberration and a perspective effect in the respective points on the subject have been corrected in units of output addresses. Accordingly, output image data in which distortion and a perspective effect resulting from an imaging lens have been corrected can be obtained. This is the same for the cases of the above-described electronic zooming and mirror-image conversion illustrated in FIGS. 9 and 10.

According to the present invention, a process of displaying an arbitrary image at a predetermined position that conventionally requires a complicated configuration and an independent process for drawing and that inevitably causes high cost can be quickly performed with a simple and inexpensive configuration, and can be preferably applied to a mobile terminal such as a monitor imaging apparatus for a vehicle, an imaging apparatus to be placed at an entrance, a monitoring apparatus, a imaging conference imaging apparatus, and so on.

The invention claimed is:

1. A computer implemented image processing method for performing image processing on captured image data obtained through an imaging lens to generate output image data, the method comprising:
    storing captured image data in a memory; wherein the image data is obtained by an image device;
    generating a look-up table in memory, the look-up table configured to store addresses of the captured image data in association with addresses of an output image data;
    storing address information of the captured image data in the lookup table;
    storing address information of the output image data in the look-up table in association with said capture image data address information;

generating an additional data area in memory, the additional data area configured to store one or more types of color signal data;

storing an address of a color signal from the additional data area in the addresses of the look-up table in association with the address of a pixel in the output image data;

generating an output image based on the addresses of the captured image data corresponding to the addresses of the output image data by referring to the look-up table; and outputting color data read from the additional data area to the address of the pixels in the output image.

2. The image processing method according to claim 1, wherein generating an output image further comprises interpolating the address of a portion of the captured image data to determine the corresponding address of the output image data.

3. The image processing method according to claim 2, wherein the address of output image data is interpolated when the address of the captured image data includes a fractional portion.

4. The image processing method according to claim 2, wherein interpolating the address comprises bilinear interpolation.

5. The image processing method according to claim 2, wherein interpolating the address comprises bicubic interpolation.

6. The image processing method according to claim 1, wherein pixels in the output image having color data from the additional data area comprise an overly on the output image.

7. An imaging apparatus comprising:

an imaging lens;

an imaging device to perform photoelectric conversion on an image obtained through the imaging lens;

a video signal processing unit to process an output signal from the imaging device and convert the output signal to imaging data;

a captured image data memory including an imaging data area that stores the imaging data processed by the imaging signal processing unit and an additional data area that stores one or more types of color signals; and a coordinate transforming unit configured to generate output image data based on data stored in the captured image data memory, wherein the coordinate transforming unit has a look-up table that stores addresses of the captured image data corresponding to addresses of the output image data in order to manipulate the output image data, and wherein an address of the color signal in the additional data area in the captured image data memory is stored in association with addresses in the look-up table corresponding to pixels constituting an arbitrary image to be displayed in the output image.

8. The imaging apparatus according to claim 7, wherein manipulation of the output image data includes at least one of correction of image distortion caused by the imaging lens, correction of image inclination caused by a perspective effect or a high-angle view, change of viewpoint, conversion to a mirror image, and electronic zooming.

9. The imaging apparatus according to claim 7, wherein the coordinate transforming unit includes an interpolating unit configured to generate image data corresponding to the addresses of the output image data by using the addresses of the captured image data obtained from the look-up table.

10. The imaging apparatus according to claim 7, wherein each of the addresses of the captured image data stored in the look-up table is bit-string data including higher-order bits and lower-order bits.

11. The imaging apparatus according to claim 10, wherein an address in a horizontal scanning direction as an x-direction in the captured image data memory is assigned to one of the higher-order bits and the lower-order bits, and an address in a vertical scanning direction as a y-direction in the captured image data memory is assigned to the other of the higher-order bits and the lower-order bits.

12. The image processing apparatus according to claim 7, wherein the imaging lens is a wide-angle lens or a fish-eye lens.

13. The image processing apparatus according to claim 7, wherein the arbitrary image is displayed as an overlay on the output image.

* * * * *